United States Patent
Ito et al.

(10) Patent No.: US 9,880,074 B2
(45) Date of Patent: Jan. 30, 2018

(54) PRESSING LOAD SETTING METHOD OF TIRE TESTING MACHINE

(71) Applicant: Kobe Steel, Ltd., Hyogo (JP)

(72) Inventors: Kohei Ito, Takasago (JP); Yasuhiro Matsushita, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 59 days.

(21) Appl. No.: 14/962,675

(22) Filed: Dec. 8, 2015

(65) Prior Publication Data

US 2016/0252432 A1     Sep. 1, 2016

(30) Foreign Application Priority Data

Feb. 26, 2015 (JP) .................................. 2015-036700

(51) Int. Cl.
*G01M 17/02* (2006.01)

(52) U.S. Cl.
CPC ................................ *G01M 17/022* (2013.01)

(58) Field of Classification Search
None
See application file for complete search history.

(56) References Cited

U.S. PATENT DOCUMENTS

| | | | | |
|---|---|---|---|---|
| 2013/0233066 A1* | 9/2013 | Wakazono | .......... | G01M 17/021 73/146 |
| 2014/0373613 A1* | 12/2014 | Wakazono | .......... | G01M 17/022 73/146 |
| 2015/0027215 A1* | 1/2015 | Wakazono | ............ | G01M 17/02 73/146 |
| 2015/0260613 A1* | 9/2015 | Okada | ................. | G01M 17/022 702/56 |
| 2017/0115187 A1* | 4/2017 | Symens | .............. | G01M 17/022 |

FOREIGN PATENT DOCUMENTS

| | | |
|---|---|---|
| EP | 3 205 999 A1 | 8/2017 |
| JP | 2013-124858 A | 6/2013 |

* cited by examiner

*Primary Examiner* — Andre Allen
(74) *Attorney, Agent, or Firm* — Studebaker & Brackett PC

(57) ABSTRACT

A tire and a drum are relatively moved so that a pressing load is increased, and stopped when the pressing load becomes a predetermined value lower than a target value. A value of the pressing load and a relative distance between the tire and the drum are measured at timings when a circumferential position of the tire is the same. A dynamic longitudinal spring constant of the tire is calculated by using change amounts of the pressing load and the relative distance. An adjustment amount serving as a distance by which the tire and the drum are relatively moved so that a value of the pressing load when relative movement is stopped becomes the target value is calculated by using the dynamic longitudinal spring constant and a difference between the arrival value and the target value. The tire and the drum are relatively moved by the adjustment amount.

4 Claims, 3 Drawing Sheets

PRESSING LOAD SETTING METHOD OF TIRE TESTING MACHINE

BACKGROUND OF THE INVENTION

Field of the Invention

The present invention relates to a pressing load setting method of a tire testing machine in which one of a tire and a drum is pressed onto the other while rotating upper and lower spindles nipping the tire, and a pressing load applied to the tire is set to be a target value.

Description of the Related Art

Tire uniformity is measured by pressing one of a tire and a drum onto the other and rotating the tire in a state where a load is applied to the tire. At this time, the tire is pressed at a target load value according to a type of the tire.

JP 2013-124858 A discloses a pressing load setting method of tire uniformity measurement in which relative movement of a rotating body and a tire is precisely stopped at a target load value by using a dynamic longitudinal spring constant calculated for each tire to be supplied for the tire uniformity measurement. According to technique described in JP 2013-124858 A, a pressing load can be promptly set to be the target load value with high precision.

However, in JP 2013-124858 A, circumferential position matching of the tire is not performed at the time of calculating the dynamic longitudinal spring constant. Therefore, when the dynamic longitudinal spring constant of the tire is not uniform in the circumferential direction, an accurate dynamic longitudinal spring constant cannot be calculated.

SUMMARY OF THE INVENTION

An object of the present invention is to provide a pressing load setting method of a tire testing machine in which a pressing load can be set to be a target value with high precision.

The present invention is characterized by a pressing load setting method of a tire testing machine in which one of a tire and a drum is pressed onto the other while rotating upper and lower spindles nipping the tire, and a pressing load applied to the tire is set to be a target value, the pressing load setting method including a drive control step of driving a drive source that rotates the upper and lower spindles and relatively moves the tire and the drum in such a manner that the pressing load is increased, and stopping drive of the drive source at a timing when the pressing load becomes a predetermined value lower than the target value, a measurement step of respectively measuring a value of the pressing load and a relative distance between the tire and the drum at two time points when a circumferential position of the tire is the same after pressing of the drum onto the tire is started, a spring constant calculation step of calculating a dynamic longitudinal spring constant of the tire by using a change amount of the pressing load and a change amount of the relative distance, an adjustment amount calculation step of calculating an adjustment amount serving as a distance by which the tire and the drum are relatively moved so that an arrival value serving as a value of the pressing load when relative movement of the tire and the drum is stopped becomes the target value by using a difference between the arrival value and the target value and the dynamic longitudinal spring constant, and an adjustment step of relatively moving the tire and the drum by the adjustment amount.

According to the present invention, the value of the pressing load and the relative distance between the tire and the drum are respectively measured at the two time points when the circumferential position of the tire is the same after the pressing of the drum onto the tire is started. The dynamic longitudinal spring constant of the tire is calculated by using the change amount of the pressing load and the change amount of the relative distance. Thereby, even when the dynamic longitudinal spring constant of the tire is not uniform in the circumferential direction, an accurate dynamic longitudinal spring constant can be calculated. Therefore, by using this dynamic longitudinal spring constant, the pressing load can be set with high precision.

DESCRIPTION OF THE PREFERRED EMBODIMENTS

Hereinafter, a preferred embodiment of the present invention will be described with reference to the drawings.
(Configuration of Tire Testing Machine)

In a pressing load setting method of a tire testing machine according to the embodiment of the present invention (pressing load setting method), one of a tire and a drum is pressed onto the other while rotating upper and lower spindles nipping the tire, and a pressing load applied to the tire is set to be a target value.

Figure 1:
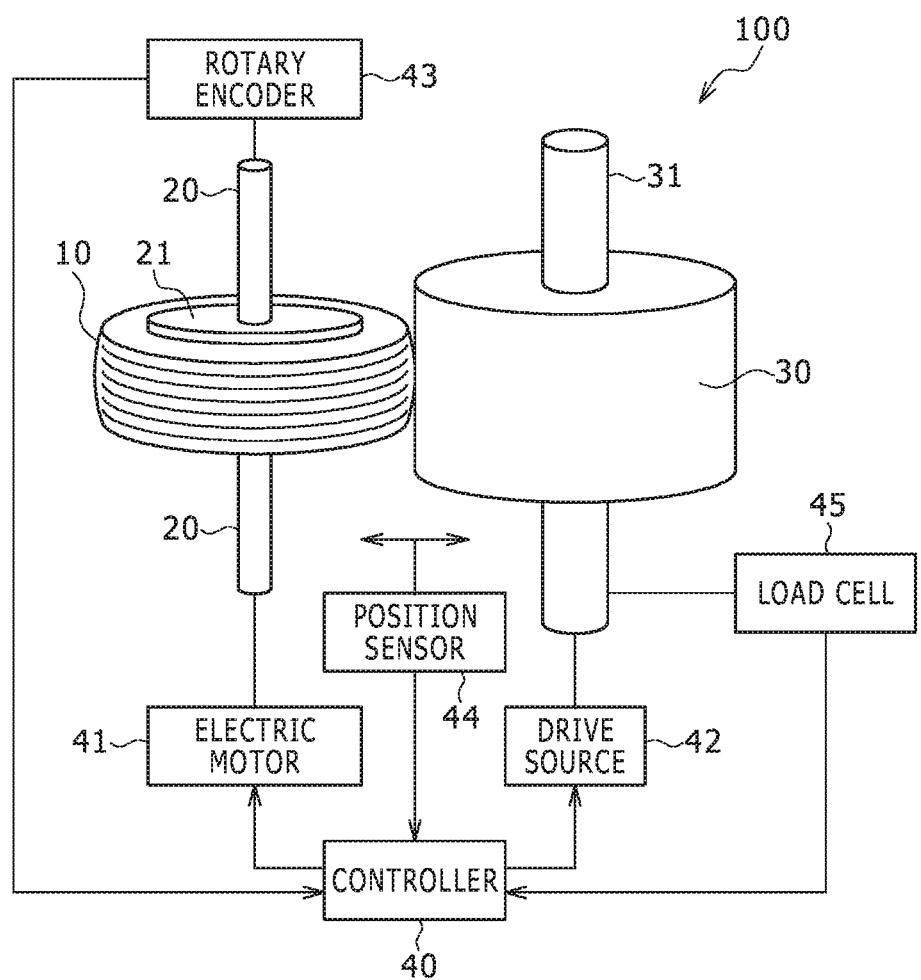
FIG. 1 is a schematic view showing major parts of a tire testing machine.

As shown in FIG. 1 serving as a schematic view showing major parts, a tire testing machine 100 has upper and lower spindles 20 nipping a test tire 10, a drum 30 to be pressed onto the test tire 10, and a controller 40 that controls the tire testing machine 100.

The upper and lower spindles 20 nip the test tire 10 from both the upper and lower sides by a pair of rims 21 while center thereof is matched with axial center of the test tire 10. The upper and lower spindles 20 are driven and rotated by an electric motor 41. Thereby, the test tire 10 is rotated in a state where the test tire is nipped by the pair of rims 21. A rotary encoder 43 is attached to the upper and lower spindles 20. By the rotary encoder 43, a rotation position of the test tire 10 can be detected.

The drum 30 is formed in a flattened columnar shape including a rotation shaft 31 in center thereof. The drum 30 is axially supported so as to be rotatable about the vertical direction. The rotation shaft 31 of the drum 30 is moved so as to be brought close to or away from the upper and lower spindles 20 by a moving mechanism (not shown) driven by a drive source 42. A position sensor 44 is provided in this moving mechanism. A moving amount of the rotation shaft 31 of the drum 30 is measured by the position sensor 44 as a change amount of a relative distance between the upper and lower spindles 20 and the rotation shaft 31 of the drum 30. The upper and lower spindles 20 may be moved so as to be brought close to or away from the drum 30.

By moving the rotation shaft 31 of the drum 30 so as to bring the rotation shaft close to the upper and lower spindles 20, the drum 30 is pressed onto the test tire 10. An outer circumferential surface of the drum 30 to be brought into contact with the test tire 10 is emboss-textured. When the test tire 10 is rotated in a state where the drum 30 is pressed onto the test tire 10, the drum 30 is rotated without generating slippage on the pressed surface. Load cells 45 that detect a pressing load applied to the test tire 10 are arranged in both ends of the rotation shaft 31 of the drum 30 (only one of the load cells is shown in the figure). The load cells 45 may be arranged in bearing portions that axially support the upper and lower spindles 20.

The controller 40 controls the tire testing machine 100 to rotate the upper and lower spindles 20 and move the rotation shaft 31 of the drum 30. Thus, the controller 40 controls the electric motor 41 and the drive source 42. Measured information such as the moving amount of the rotation shaft 31 of the drum 30 and the pressing load applied to the test tire 10 are inputted to the controller 40.

(Control by Controller)

Figure 2:
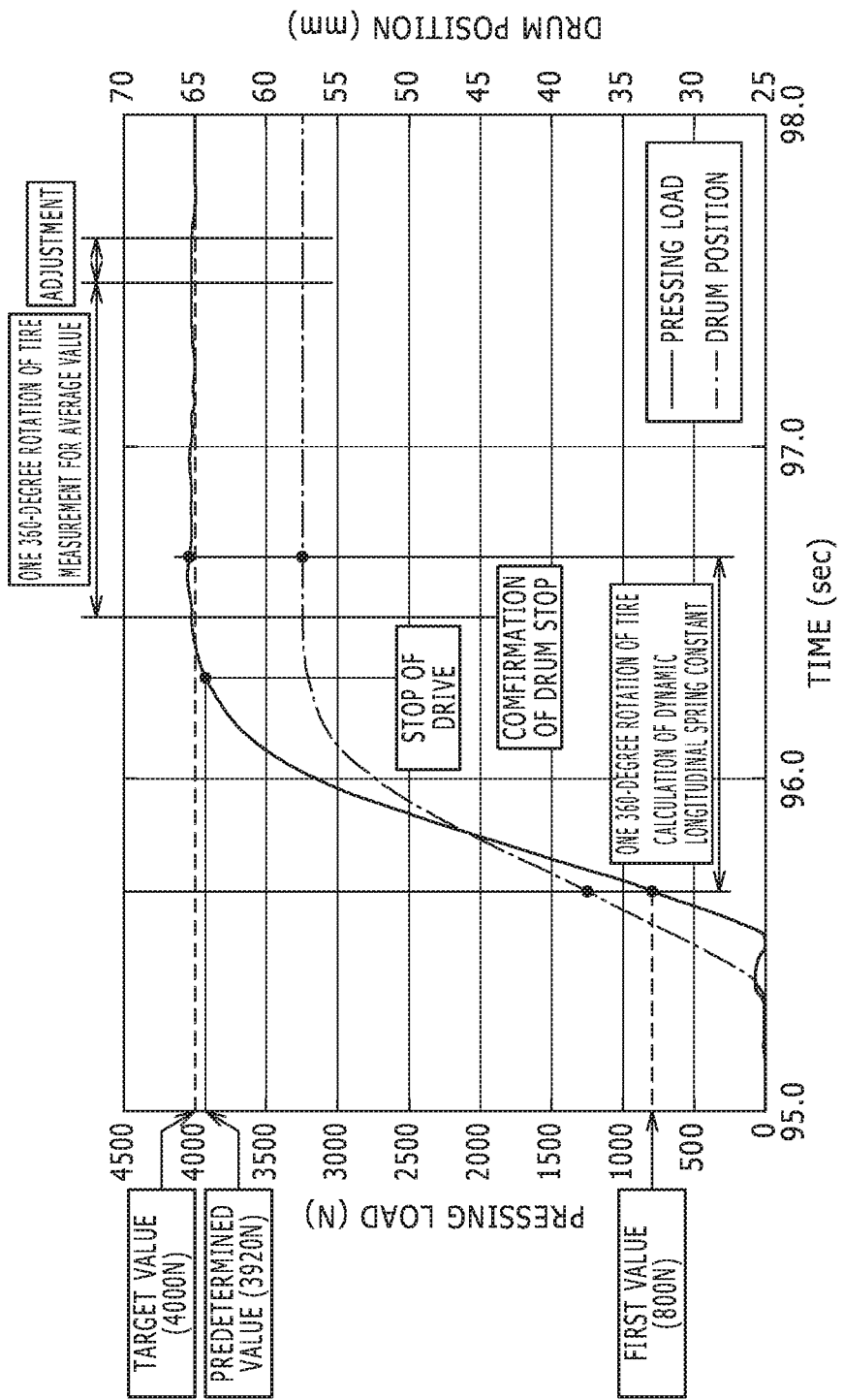
FIG. 2 is a graph showing time changes of a position of a rotation shaft of a drum and a pressing load applied to a test tire.

FIG. 2 shows time changes of a position of the rotation shaft 31 of the drum 30 and the pressing load applied to the test tire 10. The controller 40 controls the tire testing machine 100 to perform a drive control step of driving the drive source 42 that rotates the upper and lower spindles 20 and relatively moves the test tire 10 and the drum 30 in such a manner that the pressing load is increased, and stopping drive of the drive source 42 at a timing when the pressing load becomes a predetermined value lower than a target value. Specifically, the controller 40 drives the drive source 42 during rotation of the upper and lower spindles 20 and presses the drum 30 onto the test tire 10. The drive of the drive source 42 is stopped at a timing when the pressing load applied to the test tire 10 becomes for example 3,920 N (predetermined value) serving as 98% of the target value (4,000 N).

There is a time lag between stop of the drive source 42 and actual stop of movement of the drum 30. During this time lag, the drum 30 is continuously moved by inertia. Therefore, a value of the pressing load when the movement of the drum 30 is actually stopped is larger than a value of the pressing load when the drive of the drive source 42 is stopped (3,920 N).

To the tire testing machine 100, the controller 40 performs a measurement step of respectively measuring the value of the pressing load and a relative distance between the test tire 10 and the drum 30 at two time points when a circumferential position of the test tire 10 is the same after pressing of the drum 30 onto the test tire 10 is started. Specifically, to the tire testing machine 100, the controller 40 performs a first acquirement step of, at a timing when the pressing load becomes a first value lower than the predetermined value (3,920 N), acquiring a first distance serving as the relative distance at this time, and a second acquirement step of, at a timing when the test tire 10 further makes at least one 360-degree rotation after the pressing load becomes the first value and the circumferential position of the test tire 10 is the same, acquiring a second distance serving as the relative distance at this time and a second value serving as a value of the pressing load at this time.

Whether the circumferential position of the test tire 10 is the same or not is determined by a value of the rotary encoder 43. That is, the value of the rotary encoder 43 at a time point when the first acquirement step is performed is acquired, and the rotation position of the test tire 10 at the time point is stored. After that, the controller 40 continuously acquires the value of the rotary encoder 43, and determines that the circumferential position of the test tire 10 becomes the same when the rotation position of the test tire 10 is matched with the stored rotation position (that is, the rotation position where the first acquirement step is performed).

More specifically, at a timing when the pressing load becomes 800 N (first value) serving as 20% of the target value (4,000 N) during the pressing of the drum 30 onto the test tire 10, the controller 40 acquires a position of the drum 30 at this time (first position). At a timing when the test tire 10 further makes just one 360-degree rotation after the pressing load becomes 800 N, the controller 40 acquires a position of the drum 30 at this time (second position) and a value of the pressing load at this time (second value). The position of the drum 30 indicates a position from the original point set in advance. In the example of FIG. 2, the second value exceeds the target value (4,000 N). Although the test tire 10 makes one 360-degree rotation in the example of FIG. 2, the test tire may make two 360-degree rotations.

After the measurement step, the controller 40 performs a spring constant calculation step of calculating a dynamic longitudinal spring constant of the test tire 10 by using a change amount of the pressing load and the change amount of the relative distance. Specifically, the controller 40 calculates the dynamic longitudinal spring constant $k=(P2-P1)/(L2-L1)$ by using a difference between the first value (P1) and the second value (P2) of the pressing load and a difference between the first distance (L1) and the second distance (L2). More specifically, the controller 40 calculates an increment of the pressing load from the difference between the first value (800 N) and the second value, and also calculates the moving amount of the drum 30 from the difference between the first position and the second position. The dynamic longitudinal spring constant is calculated by using these. By using the value of the pressing load and the position of the drum 30 acquired at the timing when the circumferential position of the test tire 10 is the same, even when the dynamic longitudinal spring constant of the test tire 10 is not uniform in the circumferential direction, an accurate dynamic longitudinal spring constant can be calculated.

To the tire testing machine 100, the controller 40 performs an average value calculation step of measuring the pressing load during just one 360-degree rotation of the test tire 10 after the relative movement of the test tire 10 and the drum 30 is stopped and calculating an average value of the pressing load of the time. That is, the controller 40 measures the pressing load during just one 360-degree rotation of the test tire 10 after the stop of the drum 30 is confirmed. The average value of the pressing load during the one 360-degree rotation is calculated. Whether the test tire 10 makes just one 360-degree rotation or not after measurement of the pressing load for average value calculation is started may be determined by the controller 40 while acquiring the value of the rotary encoder 43 as well as the determination of the timing for performing the second acquirement step. Although the test tire 10 makes one 360-degree rotation in the example of FIG. 2, the test tire may make two or more 360-degree rotations.

In the example of FIG. 2, before acquiring the second position and the second value, the measurement of the pressing load for the average value calculation is started. That is, the average value calculation step is started during the measurement step. Therefore, the one 360-degree rotation of the test tire 10 in the measurement step overlaps the one 360-degree rotation of the test tire 10 in the average value calculation step. In such a way, by starting the measurement of the pressing load for the average value calculation after the stop of the drum 30 is confirmed and before the second position and the second value are acquired, a time required for setting the pressing load to be the target value can be shortened.

After the average value calculation step, the controller 40 performs an adjustment amount calculation step of calculating an adjustment amount serving as a distance by which the test tire 10 and the drum 30 are relatively moved so that an arrival value serving as a value of the pressing load when the relative movement is stopped becomes the target value by using a difference between the arrival value and the target value and the dynamic longitudinal spring constant. Specifically, the controller 40 calculates the adjustment amount (Lmov=Pmov/k) by using the above average value of the pressing load as the arrival value and using a difference between the average value and the target value (Pmov) and the dynamic longitudinal spring constant (k).

After the adjustment amount calculation step, the controller 40 controls the tire testing machine 100 to perform an adjustment step of relatively moving the test tire 10 and the drum 30 by the adjustment amount. Specifically, in a case where the adjustment amount is a positive value, the controller 40 moves the rotation shaft 31 of the drum 30 so that the drum 30 is pressed onto the test tire 10 by the adjustment amount. Meanwhile, in a case where the adjustment amount is a negative value, the controller 40 moves the rotation shaft 31 of the drum 30 so that the drum 30 is brought away from the test tire 10 by the adjustment amount. In the example of FIG. 2, the adjustment amount is a negative value. By calculating the adjustment amount by using the average value of the pressing load as the arrival value, the adjustment amount can be calculated with high precision. Thus, adjustment can be precisely performed.

In a case where the difference between the average value of the pressing load and the target value is within a fixed range, the controller 40 does not calculate the adjustment amount and perform the adjustment step but finishes setting of the pressing load. That is, only in a case where the difference between the average value of the pressing load and the target value is out of the fixed range, the adjustment amount is calculated. In such a way, by finishing the setting straightaway in a case where the difference between the average value and the target value is within the fixed range, the time required for the setting of the pressing load can be shortened.

(Pressing Load Setting Processing Routine)

Figure 3:
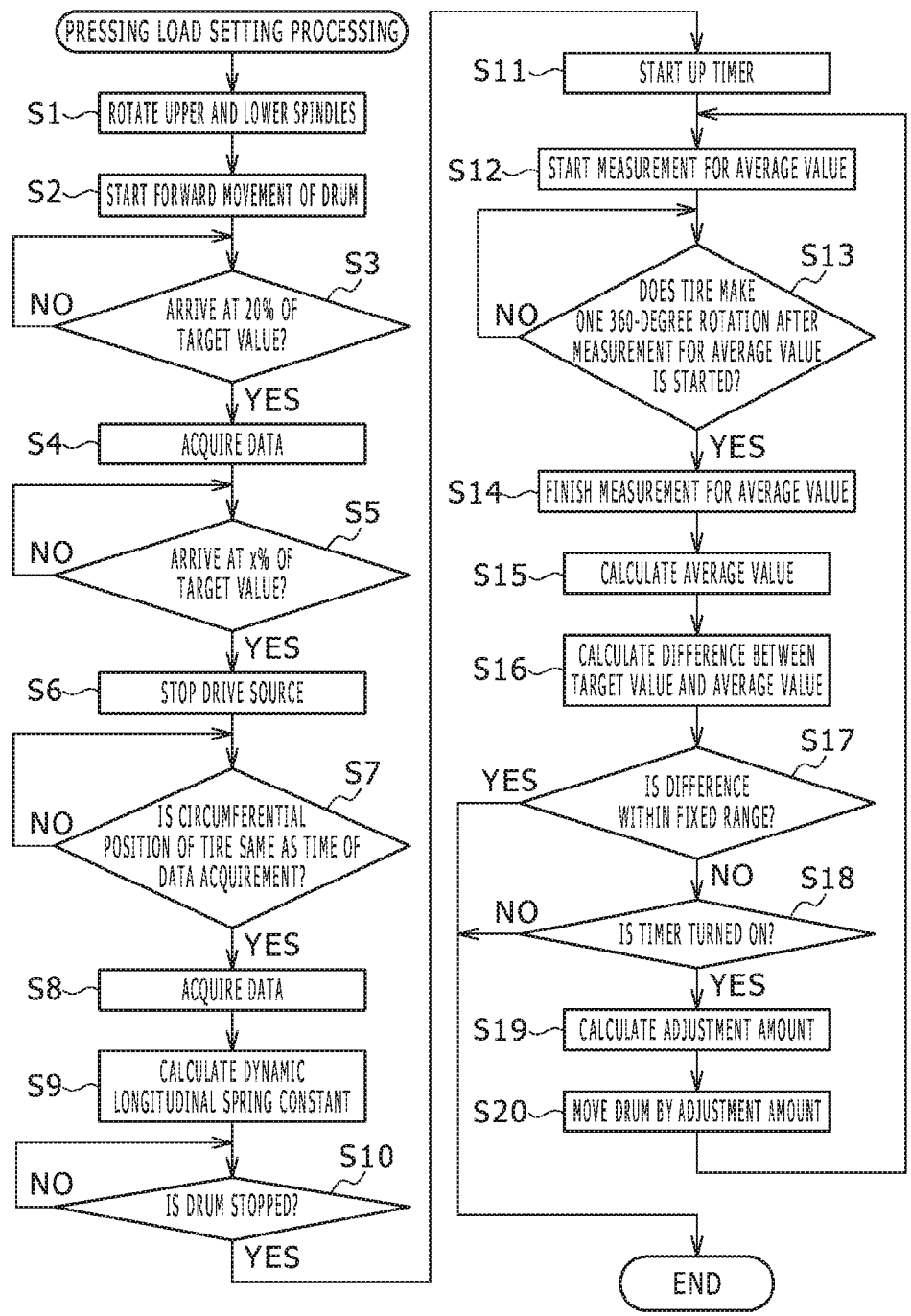
FIG. 3 is a flowchart showing pressing load setting processing of the tire testing machine.

Next, with reference to a pressing load setting processing routine shown in FIG. 3 of a flowchart, the pressing load setting method will be described. This pressing load setting processing routine is executed by the controller 40.

Firstly, the upper and lower spindles 20 are rotated (Step S1). Thereby, the test tire 10 is rotated. Next, by driving the drive source 42, forward movement of the drum 30 toward the test tire 10 is started (Step S2).

It is determined whether or not the pressing load applied to the test tire 10 arrives at 20% of the target value (4,000 N) (first value) (Step S3). In a case where it is determined that the pressing load applied to the test tire 10 does not arrive at 20% of the target value (4,000 N) in Step S3 (S3: NO), Step S3 is repeated. Meanwhile, in a case where it is determined that the pressing load applied to the test tire 10 arrives at 20% of the target value (4,000 N) in Step S3 (S3: YES), data is acquired (Step S4). That is, the position of the drum 30 at this time (first position) is acquired. At the same time, the value of the rotary encoder 43 at this time is acquired and stored.

Next, it is determined whether or not the pressing load applied to the test tire 10 arrives at x % (an arbitrary value can be set as x) such as 98% of the target value (4,000 N) (second value) (Step S5). In a case where it is determined that the pressing load applied to the test tire 10 does not arrive at 98% of the target value (4,000 N) in Step S5 (S5: NO), Step S5 is repeated. Meanwhile, in a case where it is determined that the pressing load applied to the test tire 10 arrives at 98% of the target value (4,000 N) in Step S5 (S5: YES), the drive source 42 is stopped (Step S6). The drum 30 is continuously moved by inertia and then stopped.

Next, based on the value of the rotary encoder 43, it is determined whether or not the circumferential position of the test tire 10 is the same as the time of data acquirement of Step S4 in Step S7 (Step S7). In a case where it is determined that the circumferential position of the test tire 10 is not the same as the time of data acquirement of Step S4 in Step S7 (S7: NO), Step S7 is repeated. Meanwhile, in a case where it is determined that the circumferential position of the test tire 10 is the same as the time of data acquirement of Step S4 in Step S7 (S7: YES), data is acquired (Step S8). That is, the position of the drum at this time (second position) and the value of the pressing load at this time (second value) are acquired.

Next, by using the first value, the second value, the first position, and the second position, the dynamic longitudinal spring constant is calculated (Step S9). After that, it is determined whether or not the drum 30 is stopped (Step S10). In a case where it is determined that the drum 30 is not stopped in Step S10 (S10: NO), Step S10 is repeated. Meanwhile, in a case where it is determined that the drum 30 is stopped in Step S10 (S10: YES), a timer is started up (Step S11).

Next, the measurement for the average value of the pressing load is started (Step S12). That is, the measurement of the pressing load is started. Based on the value of the rotary encoder 43, it is determined whether or not the test tire 10 makes one 360-degree rotation after the measurement is started (Step S13). In a case where it is determined that the test tire 10 does not make one 360-degree rotation after the measurement is started in Step S13 (S13: NO), Step S13 is repeated. Meanwhile, in a case where it is determined that the test tire 10 makes one 360-degree rotation after the measurement is started in Step S13 (S13: YES), the measurement for the average value is finished (Step S14). That is, the measurement of the pressing load is finished.

Next, the average value is calculated (Step S15). The difference between the target value and the average value is calculated (Step S 16). It is determined whether or not the difference between the target value and the average value is within the fixed range (Step S17). In a case where it is determined that the difference between the target value and the average value is within the fixed range in Step S17 (S17: YES), the present routine is finished.

Meanwhile, in a case where it is determined that the difference between the target value and the average value is out of the fixed range in Step S17 (S17: NO), it is determined whether or not the timer is turned ON (Step S18). In a case where it is determined that the timer is not turned ON in Step S18 (S 18: NO), the present routine is finished.

Meanwhile, in a case where it is determined that the timer is turned ON in Step S18 (S18: YES), the adjustment amount is calculated (Step S19). The drum 30 is moved by the adjustment amount (Step S20). Then, the flow is returned to Step S12. That is, the average value is calculated again. While the timer is turned ON, that is, until a fixed time elapses and the timer is turned OFF, adjustment is repeated. That is to say, by restricting a time for the adjustment to the fixed time, extension of the time required for the setting of the pressing load can be prevented.

In the example of FIG. 2, the measurement for the average value is started before the second position and the second value are acquired. That is, in FIG. 3, Steps S7 to S9 are performed in parallel after Step S12 and before Step S14. Thereby, the tire required for setting the pressing load to be the target value can be shortened.

(Effects)

As described above, with the pressing load setting method of the tire testing machine according to the present embodiment, the value of the pressing load and the position of the drum 30 are respectively measured at the timing when the circumferential position of the test tire 10 is the same after the pressing of the drum 30 onto the test tire 10 is started. The dynamic longitudinal spring constant of the test tire 10 is calculated by using the change amount of the pressing load and the moving amount of the drum 30. Thereby, even when the dynamic longitudinal spring constant of the test tire 10 is not uniform in the circumferential direction, an accurate dynamic longitudinal spring constant can be calculated. Therefore, by using this dynamic longitudinal spring constant, the pressing load can be set with high precision.

By using the difference between the first value and the second value and the difference between the first position and the second position, an accurate dynamic longitudinal spring constant can be favorably calculated.

By calculating the adjustment amount by using the average value of the pressing load as the arrival value (value of the pressing load when the relative movement of the test tire 10 and the drum 30 is stopped), the adjustment amount can be calculated with high precision. Thus, the adjustment can be precisely performed.

In a case where the difference between the arrival value when the relative movement is stopped and the target value is within the fixed range, the adjustment amount is not calculated and the adjustment step is not performed but the setting of the pressing load is finished. Thus, the time required for the setting of the pressing load can be shortened.

What is claimed is:

1. A pressing load setting method of a tire testing machine in which one of a tire and a drum is pressed onto the other while rotating upper and lower spindles nipping the tire, and a pressing load applied to the tire is set to be a target value, the pressing load setting method comprising:
    a drive control step of driving a drive source that rotates the upper and lower spindles and relatively moves the tire and the drum in such a manner that the pressing load is increased, and stopping drive of the drive source at a timing when the pressing load becomes a predetermined value lower than the target value;
    a measurement step of respectively measuring a value of the pressing load and a relative distance between the tire and the drum at two time points when a circumferential position of the tire is the same after pressing of the drum onto the tire is started;
    a spring constant calculation step of calculating a dynamic longitudinal spring constant of the tire by using a change amount of the pressing load and a change amount of the relative distance;
    an adjustment amount calculation step of calculating an adjustment amount serving as a distance by which the tire and the drum are relatively moved so that an arrival value serving as a value of the pressing load when relative movement of the tire and the drum is stopped becomes the target value by using a difference between the arrival value and the target value and the dynamic longitudinal spring constant; and
    an adjustment step of relatively moving the tire and the drum by the adjustment amount.

2. The pressing load setting method of the tire testing machine according to claim 1, wherein said measurement step has:
    a first acquirement step of, at a timing when the pressing load becomes a first value lower than the predetermined value, acquiring a first distance serving as the relative distance at the above timing; and
    a second acquirement step of, at a timing when the tire further makes at least one 360-degree rotation after the pressing load becomes the first value and the circumferential position of the tire becomes the same, acquiring a second distance serving as the relative distance at the above timing and a second value serving as a value of the pressing load at the above timing, and
    said spring constant calculation step calculates the dynamic longitudinal spring constant by using a difference between the first value and the second value and a difference between the first distance and the second distance.

3. The pressing load setting method of the tire testing machine according to claim 1, further comprising:
    an average value calculation step of measuring the pressing load during one 360-degree rotation of the tire after the relative movement of the tire and the drum is stopped and calculating an average value of the pressing load of the time, wherein
    said adjustment amount calculation step takes the average value as the arrival value.

4. The pressing load setting method of the tire testing machine according to claim 1, wherein
    said adjustment amount calculation step calculates the adjustment amount in a case where a difference between the arrival value and the target value is out of a fixed range.

* * * * *